US005785296A

United States Patent [19]

Peube et al.

[11] Patent Number: 5,785,296

[45] Date of Patent: Jul. 28, 1998

[54] ELECTROMECHANICAL ACTUATOR FOR CONTROLLING A FLOW MODULATOR OF THE VANE TYPE PIVOTING INSIDE PIPE

[75] Inventors: Jean-Laurent Peube, Naintre; Jean-Claude Trigeassou, Mignaloux-Beauvoir, both of France

[73] Assignee: Centre National de la Recherche Scientifique (CNRS), Paris, France

[21] Appl. No.: 356,266

[22] PCT Filed: Jun. 25, 1993

[86] PCT No.: PCT/FR93/00643

§ 371 Date: Jan. 27, 1995

§ 102(e) Date: Jan. 27, 1995

[87] PCT Pub. No.: WO94/00858

PCT Pub. Date: Jan. 6, 1994

[30] Foreign Application Priority Data

Jun. 26, 1992 [FR] France .................................. 92 07899

[51] Int. Cl.[6] .................................................. F16K 31/02

[52] U.S. Cl. ........................................ 251/129.11; 251/65

[58] Field of Search ................................ 251/129.11, 65, 251/129.01

[56] References Cited

U.S. PATENT DOCUMENTS

| | | | |
|---|---|---|---|
| 4,800,308 | 1/1989 | Tice | 251/129.11 X |
| 5,158,262 | 10/1992 | Kamerbeek et al. | 251/65 X |
| 5,238,023 | 8/1993 | Kristoffer | 251/129.11 X |

*Primary Examiner*—Kevin Lee
*Attorney, Agent, or Firm*—Oliff & Berridge, P.L.C.

[57] ABSTRACT

An electromechanical actuator for controlling a flow modulator which is pivotally mounted in a pipe to cause a rapidly variable head loss in a fluid flowing therein, the actuator being provided with a stator and a rotor. The rotor can move only through a predetermined angular sector by oscillating about an angular reference position, and a return device is provided for storing the kinetic energy of the rotor and flow modulator during angular deceleration of the rotor and at least partially returning the kinetic energy to the actuator during angular acceleration of the rotor.

11 Claims, 1 Drawing Sheet

ELECTROMECHANICAL ACTUATOR FOR CONTROLLING A FLOW MODULATOR OF THE VANE TYPE PIVOTING INSIDE PIPE

BACKGROUND OF THE INVENTION

The subject of the present invention is an electromechanical actuator for controlling a flow regulator of the vane type pivoting inside a pipe.

Rapid fluctuations in flow rate encountered in industrial plant are dynamic in nature, that is to say that their behaviour involves inertia and elasticity of the fluid or of the walls of the devices. They may be the cause of particularly troublesome phenomena such as excessive vibration giving rise to fatigue of the materials, or acoustic disturbance. These fluctuations cannot be controlled using the conventional devices for shutting off pipelines (valves, cocks . . . ) which in practice require quite a long time to open them owing to their inertia or to their displacement device (screw for example).

DE-A-3,908,546 discloses a device for driving a butterfly valve for an internal-combustion engine.

Such a device includes a rotor, secured to the butterfly valve, and a stator which includes windings capable of generating a variable magnetic field acting on the rotor to make it turn.

The rotor is equipped with a return device for establishing correspondence between the strength of the electric current flowing through the windings of the stator and the angular position of the rotor.

By virtue of this drive device, the butterfly valve may be precisely positioned angularly.

However, this device is provided only for a gas inlet valve of an internal combustion engine. Such a valve is intended to assume various stable positions in succession, each position corresponding to one set of operating conditions of the engine.

Between two variations in operating conditions, the valve remains in its angular position.

In contrast, the present invention aims to provide a very low inertia device which can impart, for example to a butterfly valve, very rapid alternating movements so as to control the surges of a fluid in a pipe.

FR-A-2,613,089 makes known a method and a device for reducing such rapid fluctuations in flow rate of a fluid flowing in a pipe.

In this document, a flow regulator is provided having the appearance of a vane or of a butterfly valve mounted so that it can pivot in a pipe and the purpose of which is to create an instantaneous head loss; its dimensions, determined as a function of this last objective, may in general lead to a shape and to dimensions which do not make it possible to close off the pipeline completely. This regulator is controlled by a driving means such as a stepper motor.

However, although it allows accurate positioning of the flow regulator, a stepper motor may have too long a response time.

Furthermore, a device which controls surges in a fluid does not, a priori, include the angular position of the flow regulator as an operating parameter. Now, knowledge of this position is indispensable if a stepper motor is used.

It is therefore necessary to have use, in addition to the stepper motor, of a device for accurately identifying the angular position of the flow regulator.

In order to overcome this drawback, the use of a conventional electric motor could be envisaged.

However, the actuation of the flow regulator is then not very reliable and even detrimental to the motor itself, because the brushes of the latter wear rapidly owing to the fact that it constantly operates in the start-up region.

Bearing in mind the values of the frequencies of oscillation required to obtain effective actuation of the flow regulator, a mechanical transmission of a rotational movement of the actuator into an oscillatory movement of the flow regulator would have too high an inertia and would preclude any possibility of matching the characteristics of the alternating movement to those of the flow rate measured.

SUMMARY OF THE INVENTION

The present invention aims to provide an actuator having a low moment of inertia, of the order of $2.10^{-7}$ kg/m$^2$, which allows it to reach very high values of acceleration, of the order of $5.10^4$ rad/s$^2$, by virtue of which the flow regulator can reach frequencies of the order of several tens to several hundreds of hertz, these frequencies being necessary for it to play its part effectively.

The subject of the present invention is an electromagnetic actuator for controlling a flow regulator of the vane type which is mounted so that it can pivot inside a pipe and which is designed to create a very rapidly variable head loss in a fluid flowing inside the pipe, the actuator including a stationary part or stator, and a part mounted so that it can rotate, or rotor, rotationally secured to the flow regulator, the stator and the rotor being equipped with electromagnetic elements such as windings and possibly with permanent magnets, which, when a current passes through them, are in a situation of electromagnetic interaction which generates angular displacements of the rotor solely within a predetermined angular sector, characterized in that it is equipped with a return device which, during the oscillations of the rotor about an angular reference position, stores up the kinetic energy of the rotor and of the flow regulator during the angular -decelerations of the rotor and restores it, at least in part, to the actuator during the angular accelerations of the rotor.

In a particular embodiment of the invention, the actuator includes adjustment means capable of shifting the angular reference position of the rotor relative to the pipe to make it coincide substantially with the mean angular position of the flow regulator which oscillates inside the pipe.

This adjustment, which may be automatic, makes it possible to improve the operation of the actuator according to the invention by matching it to the oscillations required of the flow regulator.

Preferably, the angular sector within which the rotor oscillates lies between approximately 15° and 35° and, preferably, between approximately 20° and 30°.

The actuator according to the invention has the advantage that the rotor and the flow regulator are secured to one and the same drive shaft, hence a low moment of inertia.

Furthermore, by virtue of the actuator according to the invention, the oscillation parameters of the flow regulator can quickly be matched to the characteristics of the fluid flow rate.

To do this, it is sufficient to alter the shape of the electric signal for controlling the actuator.

According to the invention, the actuator can impart high-frequency oscillatory movements to the flow regulator.

In effect, by virtue of the presence of a return device, the actuator has its own resonant frequency which is advantageously selected to be in the range of the frequencies of oscillation of the actuator. It is therefore sufficient to provide a sufficient energy difference to give the rotor the required operating frequency, which is close to the resonant frequency of the actuator.

As a result, the torque to be transmitted to the rotor to give it such a frequency of oscillation is substantially smaller by comparison with that which would have to be provided in the absence of a-return device.

As a consequence, the actuator according to the invention has the advantage of being able to reach high frequencies of oscillation, while consuming very little energy while it is operating.

Furthermore, one of the advantages of the actuator according to the invention is that it can reach higher frequencies of oscillation than in the absence of the return device; indeed, the maximum frequency is fixed by the motor torque, that is to say by the electromagnetic power available per unit of rotor volume. Now, this is in fact limited by the electric power permissible in the windings, itself limited by the possibility to dissipate the heat which it creates due to the Joule effect. The return device, by allowing mechanical energy to be stored independently of the motor torque, without involving significant inertia, thus provides the flow regulator with an effective instantaneous additional torque.

This advantage is of paramount importance in the case of the actuator being used on board a motor vehicle for controlling the gases flowing through its exhaust system, owing to the fact that in this case only a limited source of energy is available.

In one possible embodiment of the invention, the return device of the actuator is of the electromagnetic type and includes a sensor for measuring the angular position of the rotor, electromagnetic elements including an electric circuit and located on the rotor and on the stator and an electric accumulator which stores up the amount of electricity produced in the said electric circuit during the angular decelerations of the rotor and which supplies the actuator with electrical energy during the angular accelerations of the rotor.

In an alternative of this embodiment, in which the actuator is mounted on an exhaust system of a motor vehicle, the accumulator may simply be the accumulator of the vehicle.

It will be understood that, in this embodiment, the second electric circuit acts like a-generator which recovers the kinetic energy from the rotor and from the flow regulator during the phases of deceleration of the rotor and transmits it to the accumulator.

In an alternative, the electric circuit of the return device consists of the electric circuit of the actuator, switching means making it possible to switch this circuit into an actuating position or into a position for recovering energy. For this purpose a device of the reversible chopper type may, for- example, be used.

The actuator is then used alternately as a motor to actuate the flow regulator, and as an alternator to charge the electric accumulator.

The natural resonant frequency of such an actuator depends on its electric energy-recovery circuit. By varying some parameters of this circuit it is therefore possible to alter its resonant frequency, which is a considerable advantage in so far that, as explained before, the operation of the actuator is particularly economical in a range of frequencies close to its resonant frequency.

Furthermore, by adapting some of the electronic parameters of the actuator according to this embodiment, the angular position of the rotor relative to the pipe can be shifted to make it coincide with the mean position of the flow regulator, which makes it possible to improve the operation of the actuator.

According to another embodiment of the invention, the return device is of the mechanical type and includes an elastic member secured to the rotor on the one hand, and to the stator on the other hand.

The kinetic energy of the rotor and of the flow regulator, during the phases of deceleration of the rotor is here stored up in the form of potential energy by the elastic member, which may for example consist of a spring in the shape of a flat spiral. During the phases of acceleration of the rotor the elastic member releases its potential energy and plays a part in actuating the flow regulator.

The virtual absence of friction as well as the direct conversion of the kinetic energy into potential energy increases the efficiency of such a return device in terms of energy.

However, although its return device is worthwhile in terms of energy, this actuator has a fixed resonant frequency. It does not therefore adapt as easily as the previous one to the various ranges of frequency of oscillation of the flow regulator.

However, this embodiment makes it possible to increase the value of the torque for high frequencies, since this energy storage device makes it possible, as was stated earlier, to add to the value of the electromagnetic torque, a mechanical torque with which no appreciable additional inertia is associated.

Moreover, the angular position of the actuator relative to the pipe can be altered with the aid of mechanical means able to cause the actuator to pivot about a spindle which is coincident with the axis of the rotor. Thus, the angular reference position of the rotor can be shifted to make it coincide with the mean angular position of the flow regulator oscillating in the pipe.

In a third alternative, the actuator may include both an electromagnetic return device and a mechanical return device.

Such a configuration makes it possible to obtain an actuator capable of operating effectively over a wider range of frequencies, by altering its resonant frequency, combining efficiency in terms of energy and adaptability.

Advantageously, the actuator includes a position of rest which is a fixed position corresponding to a position of the flow regulator which is safe in the event of malfunction or breakdown of the actuator.

If, for example, the actuator is mounted on an exhaust system of a motor vehicle, the position of rest of the actuator corresponds to the one in which the flow regulator is held in a wide open position.

BRIEF DESCRIPTION OF THE DRAWINGS

For the purpose of making the invention easier to understand, one embodiment thereof will now be described by way of example and without any limiting nature, with reference to the appended diagrammatic drawing in which.

DESCRIPTION OF PREFERRED EMBODIMENT

Figure 1:
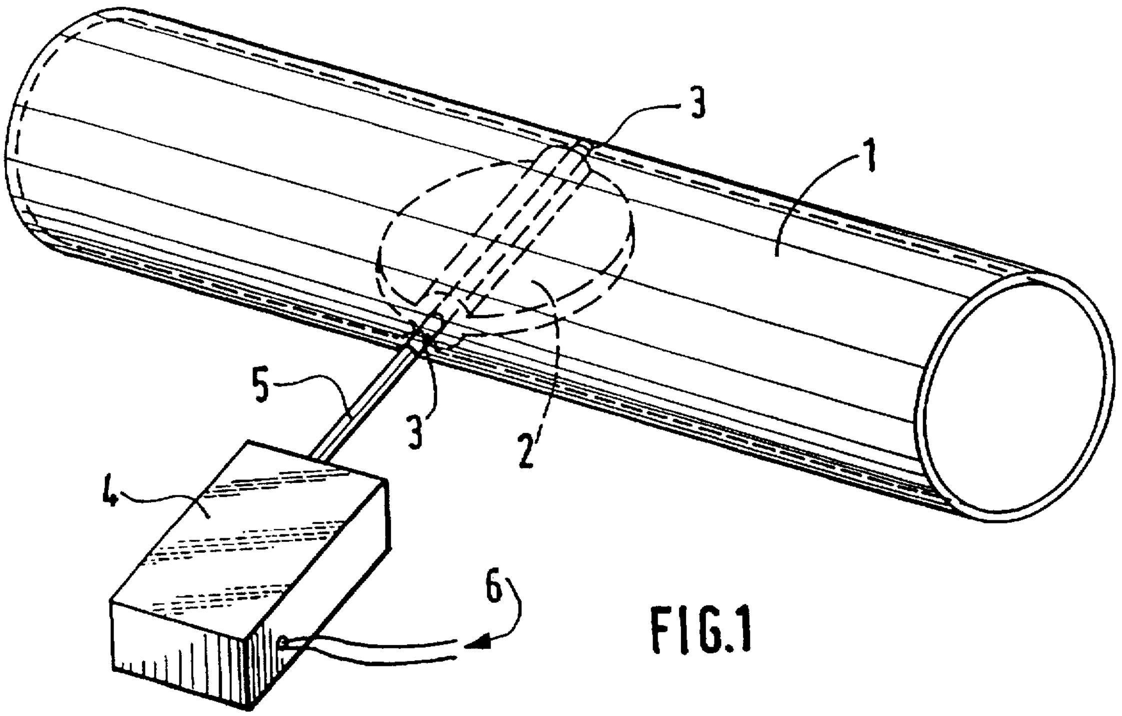
FIG. 1 diagrammatically represents a pipe equipped with an actuator according to the invention

In FIG. 1 is represented a pipe 1 in which there flows a pulsed fluid whose motion is represented by an arrow.

A butterfly valve 2 is mounted so that it can pivot about a spindle 3 inside this pipe 1 and here constitutes a flow regulator in the sense of the present invention.

An actuator 4 according to the invention is connected to the butterfly valve 2 by a driveshaft.

This actuator 4 is controlled by electric signals conveyed by electric wires 6 penetrating into the housing of the actuator 4.

In this figure, it is clear that through oscillatory movements of the butterfly valve 2, a variable head loss is created in the fluid flowing inside the pipe 1.

Figure 2:
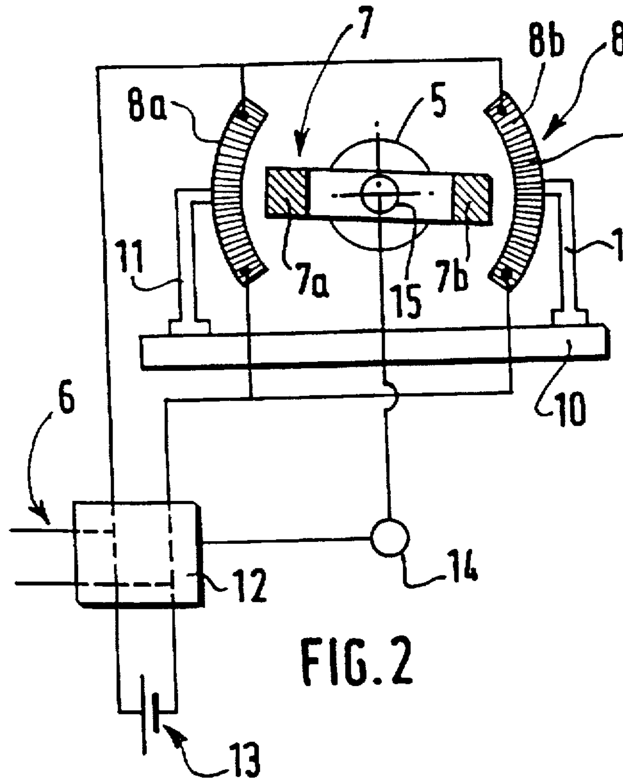
FIG. 2 represents a first embodiment of an actuator according to the invention.

In FIG. 2 is represented a first embodiment of the actuator according to the invention.

This actuator includes a central part 7 mounted so that it can rotate and which constitutes the rotor, and a stationary periperal part 8 which constitutes the stator.

In this embodiment, the rotor 7 is a permanent magnet with two poles *7a* and *7b*, while the stator 8 is produced by elements *8a* and *8b* made of soft iron each surrounded by a winding 9.

The rotor is mounted so that it can pivot about the shaft 5.

The parts *8a* and *8b* of the stator are secured to a frame 10 on which they are held by legs 11.

Switching means 12 connect the windings 9 of the stator 8 alternately to the electric wire 6 conveying the control signals and to an accumulator 13.

An operating member 14 activates the switching means 12 depending on the angular position of the rotor which is supplied to it by a position sensor 15 mounted on the driveshaft 5.

The operation of the actuator is as follows:

During the phases of acceleration of the rotor the operating member 14 makes the connection between the electric signals conveyed by the wires 6 and the stator 8 windings 9.

This results in an accelerated angular displacement of the rotor 7.

Once the said rotor 7 has gone beyond its angular reference position, the angular position sensor 15 indicates to the operating member 14 that the rotor 7 is in a deceleration phase.

Upon a signal from the operating member 14, the switching means 12 then make the connection between the windings 9 of the stator 8 and the accumulator 13.

During the deceleration phase, the actuator behaves like an alternator which generates electrical energy, which is stored up in the accumulator 13.

For the next acceleration phase, the operating member 14 activates the switching means 12 in order to connect the wires 6 which convey the electric control signal for the actuator to the windings 9 again.

The electrical energy stored up in the accumulator 13 is restored to the actuator via the electric signals conveyed by the wires 6, these signals coming from an electronic control device, not represented, which is supplied with electrical energy at least in part by the accumulator 13.

The device represented in FIG. 2 has the advantage of being able to adapt to any type of oscillation, owing to the fact that its natural resonant frequency is variable.

Figure 3:
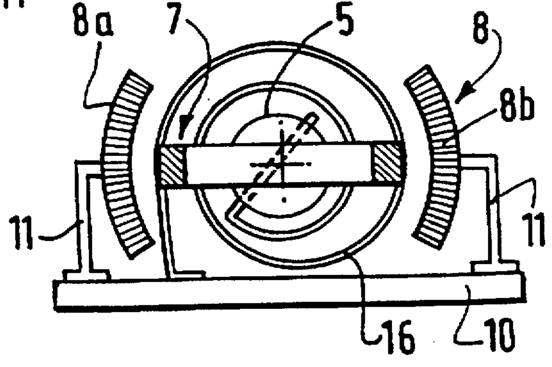
FIG. 3 represents a second embodiment of an actuator according to the invention.

The actuator represented in FIG. 3 is a substantially simpler embodiment than the previous one.

In this embodiment, we again see the rotor 7 mounted so that it can rotate about the shaft 5, as well as the stator 8 which rests on the frame 10 via legs 11.

The return device here consists of a spring in the shape of a flat spiral 16 which is secured on the one hand to the frame 10 and, on the other hand, to the driveshaft 5.

The electric circuit for supplying the windings 9 of the stator 8 has not been represented.

In this embodiment, the return device is of the mechanical type, the kinetic energy of the rotor being accumulated by the spring 16 in the form of potential energy.

Unless an auxiliary device is capable of acting on the stiffness of the spring, the resonant frequency of such an actuator is fixed, which has the drawback that the actuator cannot adapt to any frequency of oscillation without the torque which has to be transmitted to the rotor increasing.

In contrast, as explained above, the efficiency of the return device in terms of energy is high and the operating frequencies are higher than those obtained by means of the embodiment of FIG. 2.

In another embodiment, the return devices represented in FIGS. 2 and 3 could be combined, which would make it possible to ally both the high efficiency in terms of energy of a mechanical return device and the adaptability of an electromagnetic return device.

In the two embodiments described previously, the reference position about which the rotor oscillates is a fixed position.

However, it may be advantageous to cause this reference position to vary.

This can easily be achieved if a means is provided making it possible to make the actuator 4 pivot about the shaft 5.

It is clearly understood that the embodiments which have just been described have no limiting nature and that they could receive any desirable modifications without thereby departing from the scope of the invention.

In particular, only bipolar rotor and stator have been represented here, but it is quite clear that they could include more than two poles in order to increase the torque transmitted to the rotor.

Moreover, a permanent magnet has been placed on the rotor to decrease the number of windings, but the rotor may equally well include a winding.

Owing to the oscillations about a reference position, it is pointless to provide brushes in this case, flexible wires of adequate length advantageously being capable of connecting the winding of the rotor to the electric circuit of the actuator.

We claim:

1. Electromagnetic actuator for controlling a flow regulator of the vane type which is pivotally mounted inside a pipe and which is designed to create a very rapidly variable head loss in a fluid flowing inside the pipe, the actuator comprising a stator, and a rotor, rotationally secured to a flow regulator, the stator and the rotor being equipped with electromagnetic elements which, when a current passes through them, are in a situation of electromagnetic interaction which generates angular displacements of the rotor solely within a predetermined angular sector, the actuator further comprising a return device which, during oscillations of the rotor about an angular reference position, stores up kinetic energy of the rotor and of the flow regulator during angular decelerations of the rotor and restores at least a part of said kinetic energy to the actuator during angular accelerations of the rotor.

2. Actuator according to claim 1, further comprising adjustment means capable of shifting the angular reference position of the rotor relative to the pipe to make said angular reference position coincide substantially with the mean angular position of the flow regulator oscillating inside the pipe.

3. Actuator according to claim 1, wherein the angular sector within which the rotor oscillates lies between approximately 15 and approximately 35 degrees.

4. Actuator according to claim 1, wherein the return device is of an electromagnetic type and comprises a sensor for measuring the angular position of the rotor, electromagnetic elements including an electric circuit and located on the rotor and on the stator, and an electric accumulator which stores up the amount of electricity produced in the electric circuit during the angular decelerations of the rotor and which supplies the actuator with electrical energy during the angular accelerations of the rotor.

5. Actuator according to claim 4, wherein the electric circuit of the return device consists of the electric circuit of the actuator, wherein the return device further comprises a switching means, making it possible to switch the electric circuit into an actuating position or into a position for recovering electrical energy.

6. Actuator according to claim 1, wherein the return device is of a mechanical type and comprises an elastic member secured to the rotor and to the stator.

7. Actuator according to claim 1, wherein said return device comprises both an electromagnetic return device and a mechanical return device.

8. Actuator according to claim 1, comprising a position of rest corresponding to a position of the flow regulator which is safe in the event of malfunction of the actuator.

9. Actuator according to claim 1, wherein said electromagnetic elements are selected from the group consisting of windings and permanent magnets.

10. Actuator according to claim 1, wherein the angular sector within which the rotor oscillates lies between approximately 20 and approximately 30 degrees.

11. Actuator according to claim 7, wherein said electromagnetic return device comprises a sensor for measuring the angular position of the rotor, electromagnetic elements including an electric circuit and located on the rotor and on the stator, and an electric accumulator which stores up the amount of electricity produced in the electric circuit during the angular decelerations of the rotor and which supplies the actuator with electrical energy during the angular accelerations of the rotor, and wherein said mechanical return device comprises an elastic member secured to the rotor and to the stator.

* * * * *